Figure 3:
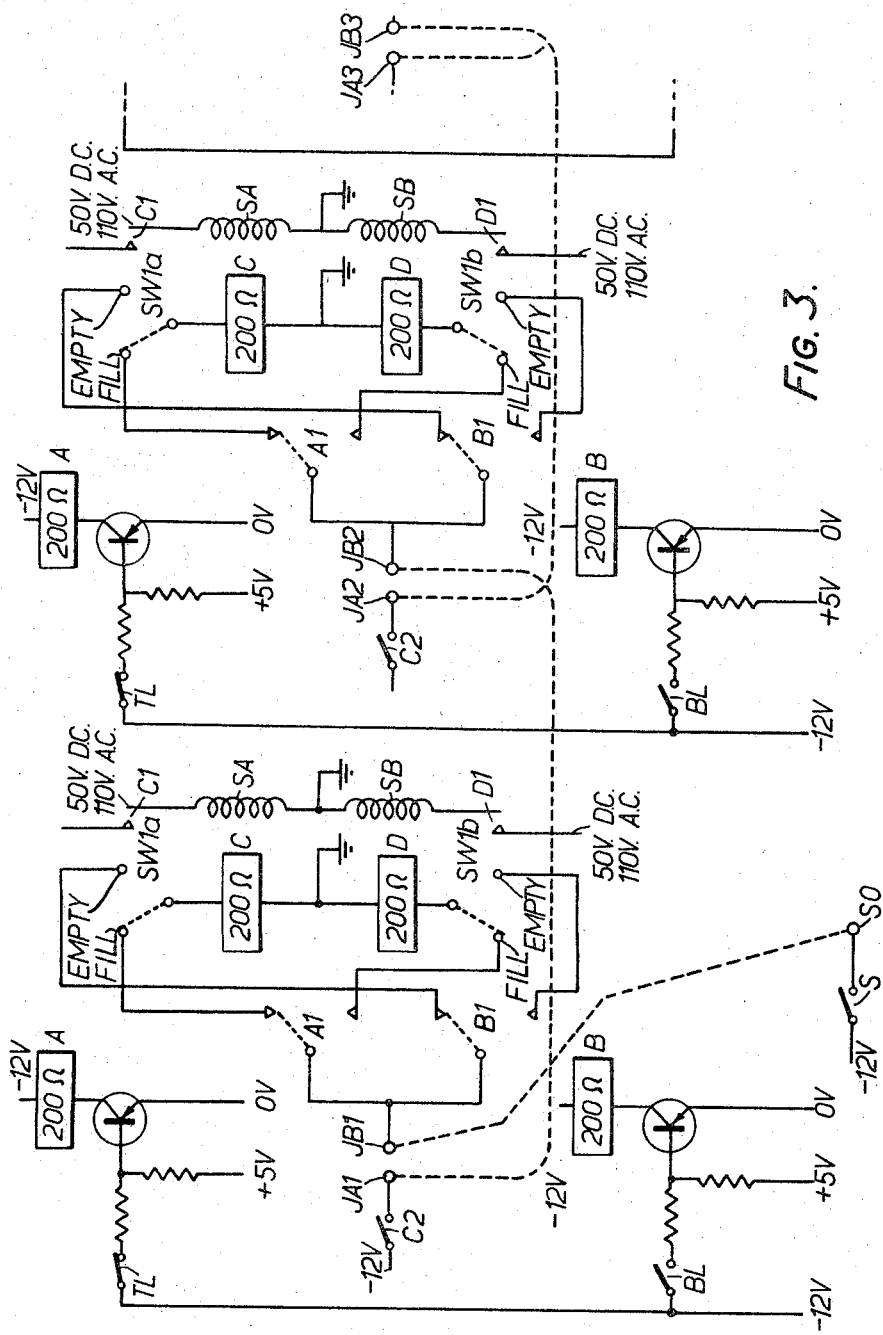

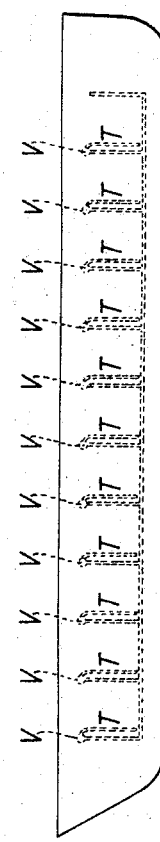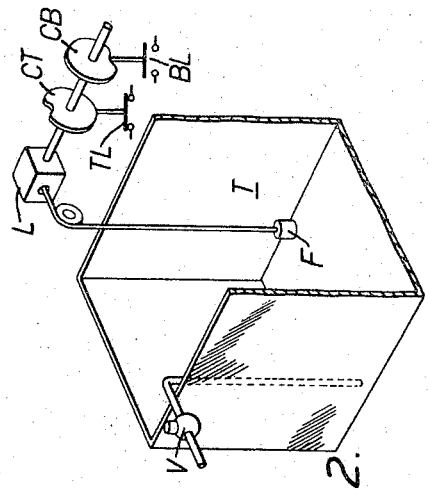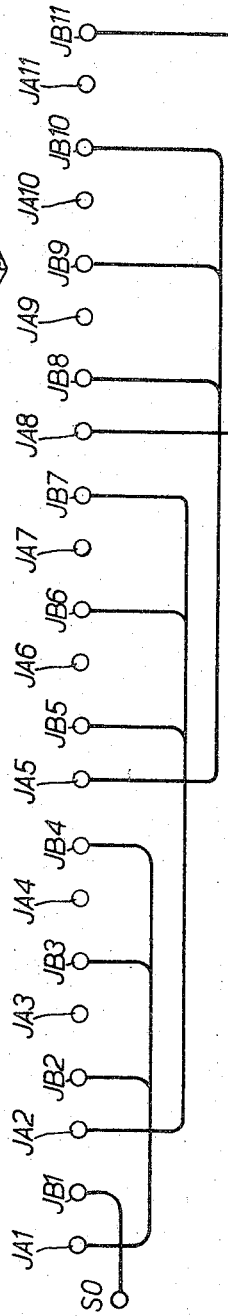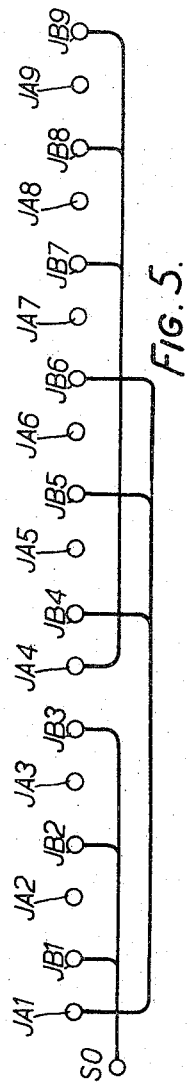

United States Patent Office 3,353,549
Patented Nov. 21, 1967

3,353,549
LIQUID FLOW CONTROL SYSTEMS
Eric H. Walker and Ian W. F. Paterson, Darlington, England, assignors to Whessoe Limited
Filed July 28, 1964, Ser. No. 385,582
Claims priority, application Great Britain, July 31, 1963, 30,343/63
5 Claims. (Cl. 137—101.25)

This invention relates to liquid flow control systems and is described below in its application to an automatic cargo handling system for tanker ships. The system provides for the automatic control of the cargo valves, through which liquid is admitted to or discharged from the several tanks of the vessel, in such a manner that the loading or unloading operation is continuous, the several tanks being filled or emptied in a predetermined sequence.

In accordance with the invention there is provided liquid flow control system for filling or emptying a plurality of containers, each having a normally closed inlet/outlet valve whose operation is controlled by a main switch which is operable to cause the valve to open, and by an upper and lower limit switch operable to reclose the valve when actuated in response to liquid reaching a predetermined high or low level during filling or emptying, respectively, characterized in that all of the main switches except the first in sequence are operated in response to actuation of the limit switches of preceding containers, whereby manual operation of the first main switch initiates the emptying or filling of all of the containers according to a predetermined sequence.

With an installation in accordance with the present invention, the operation of loading (or unloading) a tanker ship may be started by operating a main switch to close an electric circuit. This causes the opening of the main cargo valve of the first tank, allowing liquid to flow into (or out of) that tank. As soon as the first tank becomes full (or empty) its cargo valve closes and at the same time the cargo valve for the second tank is opened, these steps continuing for each tank in succession until the loading (or unloading) operation has been completed. The system may be modified so that tanks are filled (or emptied) in groups, instead of singly and although the system is designed for fully automatic operation, there is nothing in the system to prevent the use of a manual override to guard against possible emergency conditions. The order in which the tanks are filled (or emptied) is not necessarily fixed; the sequence may be determined through variable electric connections made on a plug board, or with selector switches, so that any required order of filling (emptying) can be obtained.

A particular installation in accordance with the invention is described below, by way of example, and illustrated in the accompanying drawings in which:

FIGURE 1 is a diagrammatic elevation of the hull of a tanker ship having a number of separate tanks;
FIGURE 2 is a perspective view of a single tank; and
FIGURES 3, 4 and 5 are circuit diagrams.

FIGURE 1 shows a plurality of tanks T in a hull H. As best seen in FIGURE 2, each tank T has associated therewith an inlet/outlet cargo valve V and a float F actuating a level gauge L which drives a pair of cams CT and CB for operating upper and lower limit switches TL and BL, respectively, which are thus adapted to be actuated in response to the liquid in the tank reaching a predetermined high or low level, during filling or emptying of the tank. The circuits of switches TL and BL are preferably intrinsically safe in accordance with British standard specification No. 1,259.

Part of the basic circuit of the control installation is shown in FIGURE 3, which shows only the starting switch and the parts of the circuit associated with two individual tanks T; a precisely similar circuit is provided for each of the other tanks to be controlled.

Associated with the starting switch S is a start socket SO and the circuit associated wih each ank T includes a pair of jack sockets JA1 and JB1, JA2 and JB2, etc. The order in which the tanks are to be filled or emptied is selected by making external connections (represented in the drawings by broken lines) between these sockets. The change over switches SW1a, SW1b associated with each tank are all connected together for simultaneous operation.

Intrinsically safe switch circuits in accordance with British standard specification No. 1,259 may be incorporated whenever necessary.

To carry out a filling operation, the switches SW1a and SW1b are moved to the FILL position (as shown). Since the tanks are not full, the top limit switch TL of each tank is in its normal (closed contact) position and the relay A of each tank is consequently energised. If the tanks are empty, the bottom limit switches BL will be in the alarm condition (open contact) and the relays B will be de-energised, but with the switches SW1a and SW1b in the FILL position, energisation of relays B to change over contacts B1 will be without effect.

When the starting switch S is closed manually, a circuit is completed through socket JB1, contacts A1, switch SW1b and relay D. The energisation of relay D closes contacts D1 to energise solenoid SB, which operates to open the cargo valve V of the associated tank. The liquid to be loaded accordingly flows into the tank until the tank is full, when the top limit switch TL is actuated. This releases relay A, causing contacts A1 to change over, thereby de-energising relay D and energising relay C. The operation of relay C closes contacts C1 and energises solenoid SA which operates to close the cargo valve of the first tank. Relay C also closes main switch contact C2, thus energising socket JA1, which is connected by the programming connections to the socket JB2 of the next tank to be filled, the operations already described being then repeated for that tank and for each of the other tanks in turn until all the tanks have been filled and all the cargo valves have been closed.

For unloading, the switches SW1a and SW1b are moved to the EMPTY position. If the tanks are full, the top limit switches TL will be in the alarm condition and the relays A will be de-energised, but with the switches SW1a and SW1b in the EMPTY position, energisation of these relays will be without effect. Since the tanks are not completely empty, all the bottom limit switches BL will be in the normal (closed contact) position and all the B relays will be energised. When the starting switch S is operated, relay D is energised, thus operating solenoid SB and opening the cargo valve of the first tank. When this tank is empty, the bottom limit switch BL operates, releasing relay B and de-energising solenoid SB. Relay C is energised to cause solenoid SA to close the cargo valve and to energise socket JA1, thus starting the emptying operation of the next tank.

If desired, the tanks could be filled or emptied singly in succession, but it will usually be preferable to arrange for groups of them to be filled simultaneously by providing the tanks of one group with a common switch C2, the socket JA associated with the switch being connected to the sockets JB of two or more subsequent tanks. Two possible arrangements are illustrated by way of example in FIGURES 4 and 5. In FIGURE 4 the sockets JA1, JA2 and JA5 are each connected to three subsequent sockets JB. The filling or emptying sequence will be "1"; then "2", "3" and "4"; then "5," "6" and "7"; then "8," "9" and "10"; and finally "11." In the grouping shown in FIGURE 5, the sockets SO, JA1 and JA4 are each connected to three subsequent sockets, and the order of filling or emptying will be "1," "2" and "3"; then "4," "5" and "6"; then "7," "8" and "9."

It will be appreciated that not all of the tanks T need be emptied or filled in one operation, and that by appropriate adjustment of the plugboard connections (or other variable circuit means employed) selected ones only of the tanks T can be filled or emptied in a predetermined sequence, other tanks being omitted completely from the operating sequence.

Variations and modifications of the installation described above will of course be possible within the scope of the invention. For example, the cargo valves V could be operated by other means, such as solenoid operated hydraulic valves, and the limit switches may be actuated by any alternative means dependent upon the liquid level in the associated tanks.

What is claimed is:

1. Liquid flow control system for filling and emptying a plurality of containers, said system comprising a plurality of normally closed inlet/outlet valves, one associated with each said container for admitting and extracting liquid to and from the associated container, a plurality of main switches each associated with at least one of said valves, said main switches each being operable to cause said valves to open, a plurality of upper limit switches and lower limit switches, one upper limit switch and one lower limit switch being associated with each container and responsive to predetermined upper and lower liquid levels in said associated container to cause the valve associated with that container to reclose, and means responsive to actuation of said limit switches of one container to initiate operation of the main switch of a subsequent container and changeover switch means connected to alternately render said upper limit switches operative with said lower limit switches inoperative, and vice versa.

2. A system according to claim 1 including operative connections between one main switch and a plurality of said valves.

3. A system according to claim 1, comprising a separate solenoid for opening each said valve, two changeover switches for energising said solenoid, each changeover switch being operating associated with one said limit switch, and a selector switch for rendering either one of said changeover switches operative and the other inoperative, alternately.

4. A system according to claim 3, comprising means responsive to actuation of one said limit switch to cause said changeover switch to change over, and a valve closing solenoid operative in response to said change over to close said valve.

5. Liquid flow control system for controlling the filling and emptying of a plurality of containers, comprising a separate inlet/outlet valve for admitting and extracting liquid to and from each container, and a control circuit for controlling the opening and closing of each said valve, each said circuit including a main switch for energising said circuit, a valve opening solenoid for opening said valve, a valve closing solenoid for closing said valve, a separate relay associated with each said solenoid for energizing the same, a pair of changeover switches each of which, in its operative state is adapted to control operation of both of said relays, each said changeover switch being adapted upon changing over to cause said valve opening solenoid to be de-energised and said valve closing solenoid to be energised, a two way selector switch rendering either one of said changeover switches operative and the other inoperative, as desired, an upper limit switch actuable in response to liquid in the container reaching a predetermined upper level to cause one said changeover switch to change over, a lower limit switch actuable in response to liquid in the container reaching a predetermined lower level to cause the other of said changeover switches to change over, each of said main switches except the first in operating sequence being constituted by a set of contacts of said relay associated with said valve closing solenoid of a preceding container in the sequence.

References Cited

UNITED STATES PATENTS

| | | | |
|---|---|---|---|
| 2,372,448 | 3/1945 | Porteous | 137—112 X |
| 2,516,149 | 7/1950 | Samiran | 137—113 X |
| 2,751,924 | 9/1956 | Hynd | 131—121 |
| 2,773,556 | 12/1956 | Meyers et al. | |

WILLIAM F. O'DEA, *Primary Examiner.*

D. J. ZOBKIW, *Assistant Examiner.*